(12) United States Patent
Yoda et al.

(10) Patent No.: US 11,590,979 B2
(45) Date of Patent: Feb. 28, 2023

(54) VEHICLE CONTROL DEVICE, VEHICLE, VEHICLE CONTROL METHOD, AND STORAGE MEDIUM

(71) Applicant: HONDA MOTOR CO., LTD., Tokyo (JP)

(72) Inventors: Junya Yoda, Wako (JP); Katsuya Yashiro, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 106 days.

(21) Appl. No.: 17/202,439

(22) Filed: Mar. 16, 2021

(65) Prior Publication Data
US 2021/0300373 A1   Sep. 30, 2021

(30) Foreign Application Priority Data

Mar. 25, 2020 (JP) .............................. JP2020-054882
Mar. 8, 2021  (JP) .............................. JP2021-036640

(51) Int. Cl.
*B60W 30/095* (2012.01)
*B60W 30/16*  (2020.01)
*B60W 30/18*  (2012.01)

(52) U.S. Cl.
CPC ...... *B60W 30/18163* (2013.01); *B60W 30/16* (2013.01)

(58) Field of Classification Search
CPC ........... B60W 30/18163; B60W 30/16; B60W 2554/802; B60W 2720/106; B60W 30/0956; G05D 2201/0213; G05D 1/0088; G08G 1/167; G08G 1/166; G08G 1/205; G08G 1/0133

USPC .......................................................... 701/96
See application file for complete search history.

(56) References Cited

U.S. PATENT DOCUMENTS

| | | | |
|---|---|---|---|
| 2007/0142995 A1 | 6/2007 | Wotlermann | |
| 2012/0283942 A1* | 11/2012 | T'Siobbel | G01C 21/26 701/410 |
| 2016/0161271 A1* | 6/2016 | Okumura | B60W 30/18154 701/25 |
| 2019/0322285 A1* | 10/2019 | Lagre | G05D 1/0088 |
| 2020/0247412 A1* | 8/2020 | Wang | G02B 27/01 |

(Continued)

FOREIGN PATENT DOCUMENTS

| | | |
|---|---|---|
| JP | 2015-230675 A | 12/2015 |
| JP | 2017-019397 A | 1/2017 |

OTHER PUBLICATIONS

Japanese Office Action for Japanese Patent Application No. 2021-036640 dated Sep. 22, 2022 (partially translated).

*Primary Examiner* — Abby Y Lin
*Assistant Examiner* — Hossam M Abd El Latif
(74) *Attorney, Agent, or Firm* — Thomas | Horstemeyer, LLP

(57) ABSTRACT

A vehicle control device that controls traveling of a vehicle, the vehicle control device comprises: an acquisition unit configured to acquire information of a periphery of the vehicle; and a control unit configured to, based on the information that the acquisition unit acquired, determine whether or not another vehicle, which travels in one of a plurality of traffic lanes of a merging path that merges into a traffic lane that the vehicle is traveling in, will merge into the traffic lane, and based on the determination, control travel of the vehicle.

11 Claims, 5 Drawing Sheets

(56) References Cited

U.S. PATENT DOCUMENTS

2021/0241623 A1\* 8/2021 Wang ................... G08G 1/164
2021/0253107 A1\* 8/2021 Takamatsu ........... G06V 20/588

\* cited by examiner

VEHICLE CONTROL DEVICE, VEHICLE, VEHICLE CONTROL METHOD, AND STORAGE MEDIUM

CROSS-REFERENCE TO RELATED APPLICATION(S)

This application claims priority to and the benefit of Japanese Patent Application No. 2020-054882 filed on Mar. 25, 2020, and Japanese Patent Application No. 2021-036640 filed on Mar. 8, 2021, the entire disclosures of which are incorporated herein by reference.

BACKGROUND OF THE INVENTION

Field of the Invention

The present invention relates to a vehicle control device, a vehicle, a vehicle control method, and a storage medium.

Description of the Related Art

Japanese Patent Laid-Open No. 2017-019397 discloses a travel control technique in which, in a case where there are two side-road (service road) traffic lanes in which a self-vehicle is traveling, a relative positional relationship is predicted based on traveling conditions of a self-vehicle A which is traveling on a side-road traffic lane, a main lane vehicle B and a following vehicle C, and a travel plan is calculated in order for the self-vehicle A to merge into the main lane from the side-road traffic lane.

However, in a case where another vehicle merges from a merging path with a plurality of traffic lanes into the traffic lane (the main lane) in which the self-vehicle is traveling, the need to control the travel of the self-vehicle in consideration of the traveling of other vehicles which travel in the plurality of traffic lanes of the merging path may arise.

The present invention provides a vehicle control technique by which it is possible to determine whether or not other vehicles that travel in a plurality of traffic lanes of a merging path that merges into the traffic lane (a main lane) that the vehicle (the self-vehicle) is traveling in will merge into the traffic lane, and control the traveling of a vehicle based on the determination.

SUMMARY OF THE INVENTION

According to one aspect of the present invention, there is provided a vehicle control device that controls traveling of a vehicle, the vehicle control device comprising: an acquisition unit configured to acquire information of a periphery of the vehicle; and a control unit configured to, based on the information that the acquisition unit acquired, determine whether or not another vehicle, which travels in one of a plurality of traffic lanes of a merging path that merges into a traffic lane that the vehicle is traveling in, will merge into the traffic lane, and based on the determination, control travel of the vehicle.

By virtue of the present invention, a vehicle control technique by which it is possible to determine whether or not other vehicles that travel in a plurality of traffic lanes of a merging path that merges into the traffic lane that the vehicle is traveling in will merge into the traffic lane, and control the traveling of the vehicle based on the determination can be provided.

DESCRIPTION OF THE EMBODIMENTS

Figure 1:
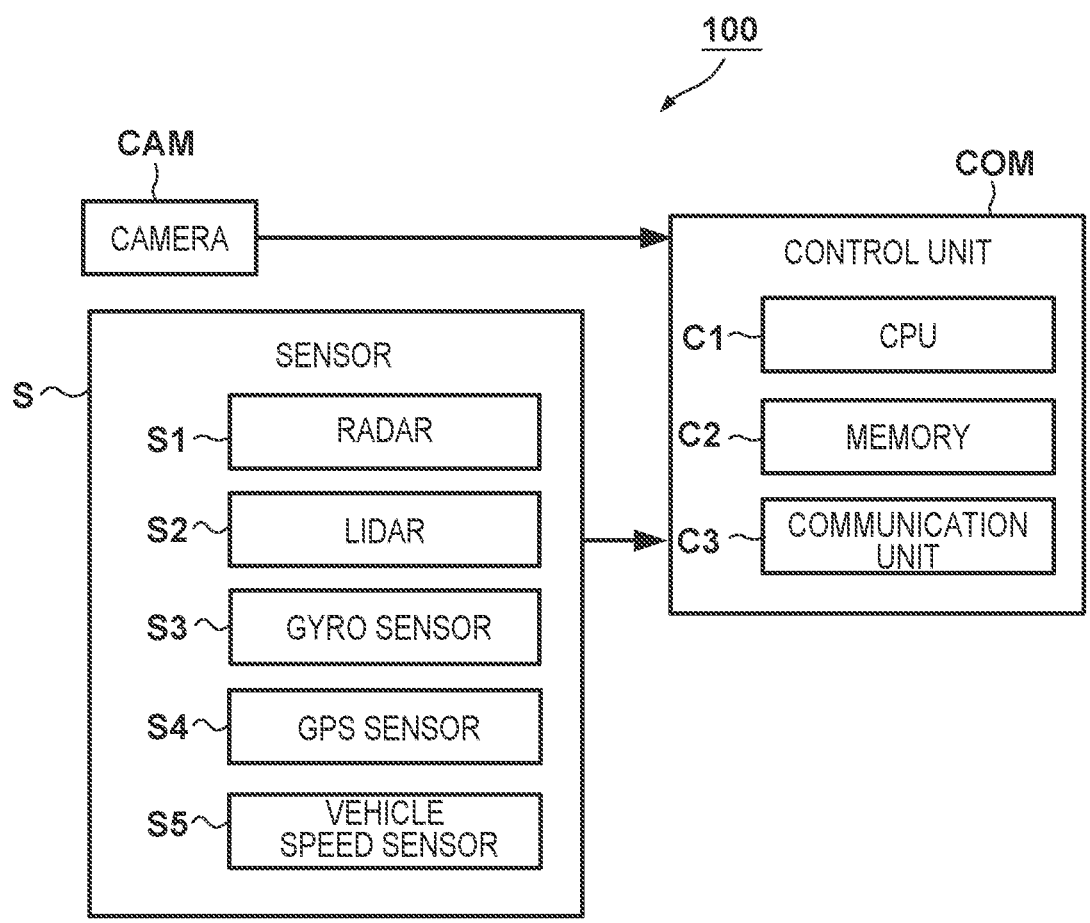
FIG. 1 is a block diagram that illustrates a basic configuration of a vehicle control device.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

(Configuration of Vehicle Control Device)

FIG. 1 is a view exemplifying a basic configuration of a vehicle control device that performs automated driving control for a vehicle (a self-vehicle). A vehicle control device 100 has sensors S, a plurality of cameras CAM, and a computer COM. The sensors S include, for example, a plurality of radars S1, a plurality of LiDARs S2 (Light Detection and Ranging), a gyro sensor S3, a GPS sensor S4, a vehicle speed sensor S5, and the like. The sensors S and the cameras CAM acquire information of the vehicle and various information of the periphery of the vehicle, and input the acquired information into the control unit COM. In addition to automated driving control, vehicle control in driving support such as follow-travel support is included in the vehicle control in the vehicle control device 100.

The control unit COM includes a CPU (C1) responsible for processing pertaining to automated driving control of the vehicle, a memory C2, and a communication unit C3 which can communicate with a server and an external device on a network, or the like. The control unit COM performs image processing on information inputted from the sensors S (the radar S1 and the LiDAR S2) and the camera CAM, extracts targets (objects) present in the periphery of the vehicle, analyzes what kind of targets are in the periphery of the vehicle, and monitors the targets.

Also, the gyro sensor S3 detects a rotational movement and orientation of the vehicle, and the control unit COM can determine the course of the vehicle based on the detection result of the gyro sensor S3, the vehicle speed detected by the vehicle speed sensor S5, and the like. Also, the control unit COM, based on a detection result of the GPS sensor S4, can acquire road information of a current position (position information) of a vehicle in map information and the traffic lane in which the vehicle (the self-vehicle) is traveling (hereinafter, referred to as the main traffic lane). Also, the control unit COM can acquire road information such as road attributes of a merging path that merges into the main traffic lane and the number of traffic lanes of the merging path.

The merging path road attributes here include attributes of a merging traffic lane that merges into a main traffic lane, and attributes of a forking traffic lane that is connected to the merging traffic lane and separates from the main traffic lane. Also, there are cases where road attributes of a merging path that has a plurality of traffic lanes have both attributes of a merging traffic lane and attributes of a forking traffic lane. For example, there are cases where the merging path has attributes of a merging traffic lane (a first merging traffic lane) that is adjacent to a traffic lane (a main traffic lane), a merging traffic lane (a second merging traffic lane) that is positioned apart in a width direction of the traffic lane (the main traffic lane), and a forking traffic lane that is connected to the merging traffic lane and is apart from the main traffic lane. Also, the merging path road attributes include attributes for a case where all of the plurality of traffic lanes are merging traffic lanes rather than forking traffic lane attributes. Also, the control unit COM can perform image processing on information inputted from the sensors S (the radar S1 and the LiDAR S2) and the camera CAM, and perform detection of other vehicles traveling on the merging path by using information of extracted targets (objects). The control unit COM can perform automated driving control of the vehicle based on information inputted from the sensors S and the camera CAM.

In a case where the vehicle control device illustrated in FIG. 1 is mounted in a vehicle, the control unit COM may be arranged in a recognition processing system ECU for processing information of the sensors S and the camera CAM, for example, or in the ECU of the image processing system, and may be arranged in an ECU for controlling a communication device or an input/output device, and may be arranged within an ECU in the control unit for performing vehicle driving control or in an ECU for automated driving. For example, as in FIG. 2 described below, functions may be distributed into a plurality of ECUs configuring the vehicle control device 100 such as an ECU for the sensors S, an ECU for the camera, an ECU for input/output devices, and an ECU for automated driving.

Figure 2:
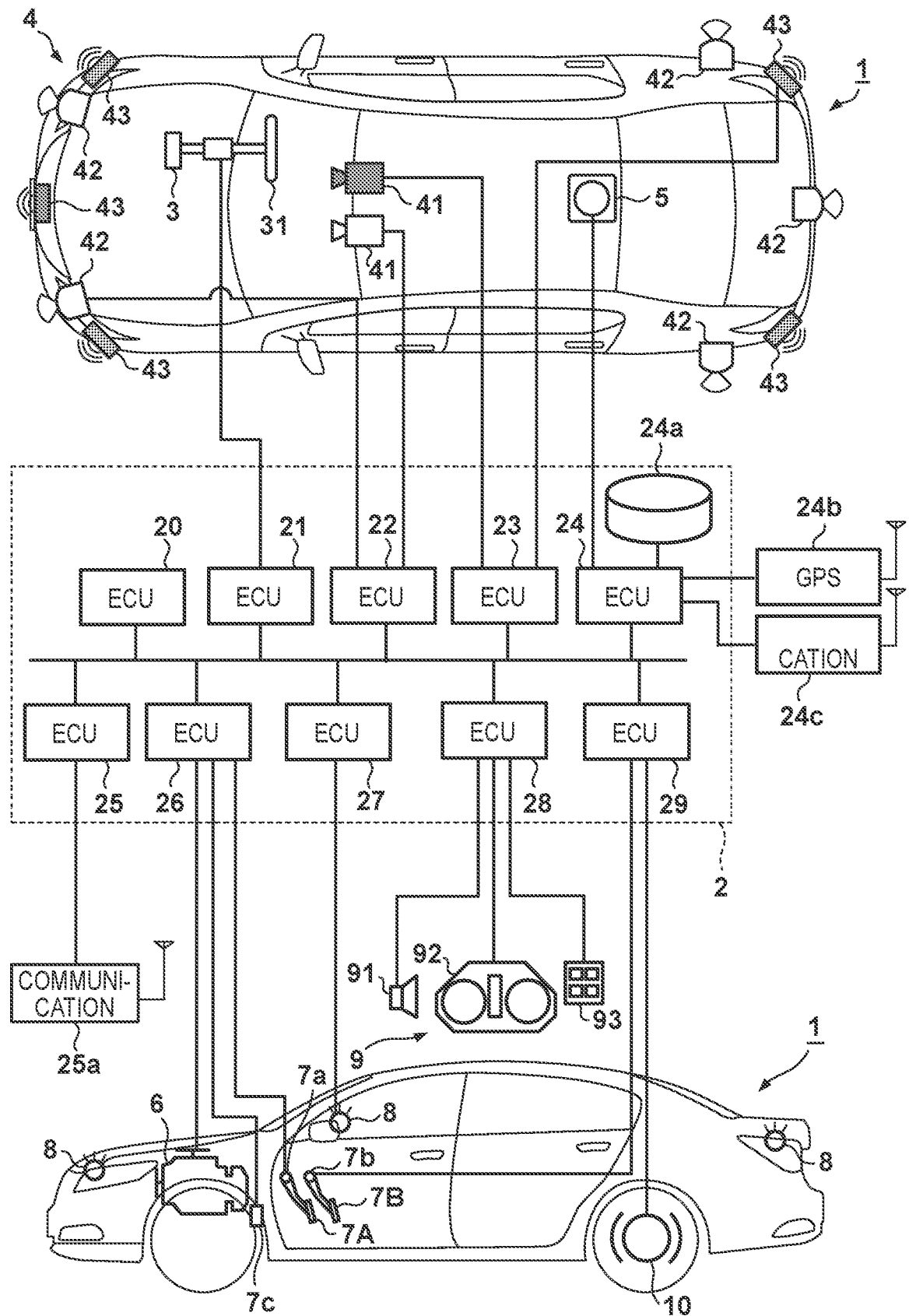
FIG. 2 is a control block diagram of a vehicle control device.

FIG. 2 is a control block diagram of the vehicle control device 100 for controlling the vehicle 1. In FIG. 2, the vehicle 1 is shown overall by a plan view and a side view. The vehicle 1 is, for example, a sedan-type four-wheeled passenger vehicle.

A control unit 2 of FIG. 2 controls each unit of the vehicle 1. The control unit 2 includes a plurality of ECUs 20 to 29 communicably connected by an in-vehicle network. Each ECU (Electronic Control Unit) includes a processor that is typified by a CPU, a storage device such as a semiconductor memory, an interface with an external device, and the like. The storage device stores programs to be executed by the processor, data to be used by the processor for processing, and the like. Each ECU may include a plurality of processors, storage devices, and interfaces and the like.

The functions and the like provided by the ECUs 20 to 29 will be described below. Note that the number of ECUs and the provided functions can be appropriately designed in the vehicle 1, and they can be subdivided or integrated as compared to this embodiment.

The ECU 20 performs vehicle control related to the automated driving of the vehicle 1 (self-vehicle) according to the present embodiment. In automated driving, at least one of steering and acceleration/deceleration of the vehicle 1 is automatically controlled. The processing related to specific control in connection with the automated driving will be described in detail later.

The ECU 20 executes control associated with automated driving of the vehicle 1. The automated driving automatically controls steering, lane changing, and acceleration/deceleration of the vehicle 1.

The ECU 21 controls an electric power steering device 3. The electric power steering device 3 includes a mechanism that steers front wheels in accordance with a driving operation (steering operation) of a driver on a steering wheel 31. In addition, the electric power steering device 3 includes a motor that generates a drive force to assist the steering operation or automatically steer the front wheels, and a sensor that detects the steering angle. If the driving state of the vehicle 1 is automated driving, the ECU 21 automatically controls the electric power steering device 3 in correspondence with an instruction from the ECU 20 and controls a travel direction of the vehicle 1.

The ECUs 22 and 23 perform control of detection units 41 to 43 that detect the peripheral state of the vehicle and information processing of detection results. The detection unit 41 is an element corresponding to the camera CAM of FIG. 1A, and is an image capturing device that detects an object in front of the vehicle 1 by capturing an image (this may be referred to as camera 41 hereinafter). In the case of this embodiment, the camera 41 is attached in the inside of the vehicle cabin of the windshield in the front portion of the roof of the vehicle 1 so that it can capture images in front of the vehicle 1. By analyzing (image processing) an image that the camera 41 captured, it is possible to extract a contour of a target positioned in front of the vehicle 1 and extract a marking line (a white line or the like) of a traffic lane on the road.

A detection unit 42 (LiDAR detection unit) is Light Detection and Ranging unit (hereinafter, may be referred to as LiDAR 42), and the detection unit 42 detects targets in the periphery of the vehicle 1 by light, and measures the distance to a target. The detection unit 42 (LiDAR 42) is configured to correspond to the LiDAR S2 of FIG. 1. In this embodiment, five LiDARs 42 are provided; one at each corner of the front portion of the vehicle 1, one at the center of the rear portion, and one on each side of the rear portion.

The detection unit 43 (radar detection unit) is a millimeter-wave radar (hereinafter may be referred to as radar 43), and detects targets in the periphery of the vehicle 1 by radio waves, and measures the distance to a target. The detection unit 43 (radar 43) is a configuration that corresponds to the radar S1 of FIG. 1. In this embodiment, five radars 43 are provided; one at the center of the front portion of the vehicle 1, one at each corner of the front portion, and one at each corner of the rear portion.

The ECU 22 performs control of one camera 41 and each LiDAR 42 and information processing of detection results. The ECU 23 performs control of the other camera 41 and each radar 43 and information processing of detection results. Since two sets of devices that detect the peripheral state of the vehicle are provided, the reliability of detection results can be improved; in addition, since detection units of different types such as cameras, LiDARs, and radars are provided, the peripheral environment of the vehicle can be analyzed from multiple aspects.

The ECU 24 performs control of a gyro sensor 5, a GPS sensor 24b, and a communication device 24c and performs information processing of detection results or communication results. The gyro sensor 5 detects a rotary motion of the vehicle 1. The course of the vehicle 1 can be determined based on the detection results of the gyro sensor 5, the wheel speed, or the like. The GPS sensor 24b detects the current position of the vehicle 1. The communication device 24c performs wireless communication with a server that provides map information and traffic information and thereby acquires these pieces of information. The ECU 24 can access a map information database 24a formed in the storage device; the ECU 24 searches for a route from the current position to the destination. The database 24a can be arranged on a network, and the communication device 24c can access the database 24a on the network, and thereby acquire the information. A gyro sensor 5, a GPS sensor 24b, and a communication device 24c are respectively configured to correspond to the gyro sensor S3, the GPS sensor S4, and the communication unit C3 of FIG. 1. The ECU 25 includes a communication device 25a for inter-vehicle communication. The communication device 25a performs wireless communication with another vehicle in the periphery and performs information exchange between the vehicles.

The ECU 26 controls a power plant 6. The power plant 6 is a mechanism that outputs a drive force to rotate the driving wheels of the vehicle 1 and includes, for example, an engine and a transmission. For example, the ECU 26 controls the output of the engine in correspondence with a driving operation (an accelerator operation or an acceleration operation) that was performed by the driver and detected by an operation detection sensor 7a provided in an acceleration pedal 7A, or the ECU 26 switches the gear ratio of the transmission based on information such as the vehicle speed detected by a vehicle speed sensor 7c (the vehicle speed sensor S5 in FIG. 1). If the driving state of the vehicle 1 is automated driving, the ECU 26 automatically controls the power plant 6 in correspondence with an instruction from the ECU 20 and controls the acceleration/deceleration of the vehicle 1.

The ECU 27 controls lighting devices (headlights, taillights, etc.) including direction indicators 8 (blinkers). In the example shown in FIG. 1, the direction indicators 8 are provided in the front portion of the vehicle 1, in door mirrors, and in the rear portion of the vehicle 1.

The ECU 28 controls an input/output device 9. The input/output device 9 outputs information to the driver and accepts input of information from the driver. A voice output device 91 notifies the driver of information by voice. A display device 92 notifies the driver of information by displaying an image. The display device 92 is arranged, for example, in front of the driver's seat and constitutes an instrument panel or the like. Note that although notification by voice and display has been exemplified here, the driver may be notified of information using a vibration or light. Alternatively, the driver may be notified of information by a combination of some of the voice, display, vibration, and light. Furthermore, the combination or the notification form may be changed in accordance with the level (for example, the degree of urgency) of information of which the driver is to be notified.

An input device 93 is a switch group that is arranged at a position where the driver can perform an operation, is used to issue an instruction to the vehicle 1, and may also include a voice input device.

The ECU 29 controls a braking device 10 and a parking brake (not shown). The braking device 10 is, for example, a disc brake device which is provided for each wheel of the vehicle 1 and decelerates or stops the vehicle 1 by applying a resistance to the rotation of the wheel. The ECU 29, for example, controls the operation of the braking device 10 in correspondence with a driving operation (brake operation) of the driver detected by an operation detection sensor 7b provided on a brake pedal 7B. If the driving state of the vehicle 1 is automated driving, the ECU 29 automatically controls the braking device 10 in correspondence with an instruction from the ECU 20 and controls deceleration and stopping of the vehicle 1. The braking device 10 or the parking brake can also be operated to maintain the stationary state of the vehicle 1. In addition, if the transmission of the power plant 6 includes a parking lock mechanism, it can be operated to maintain the stationary state of the vehicle 1.

CONTROL EXAMPLE

Figure 3:
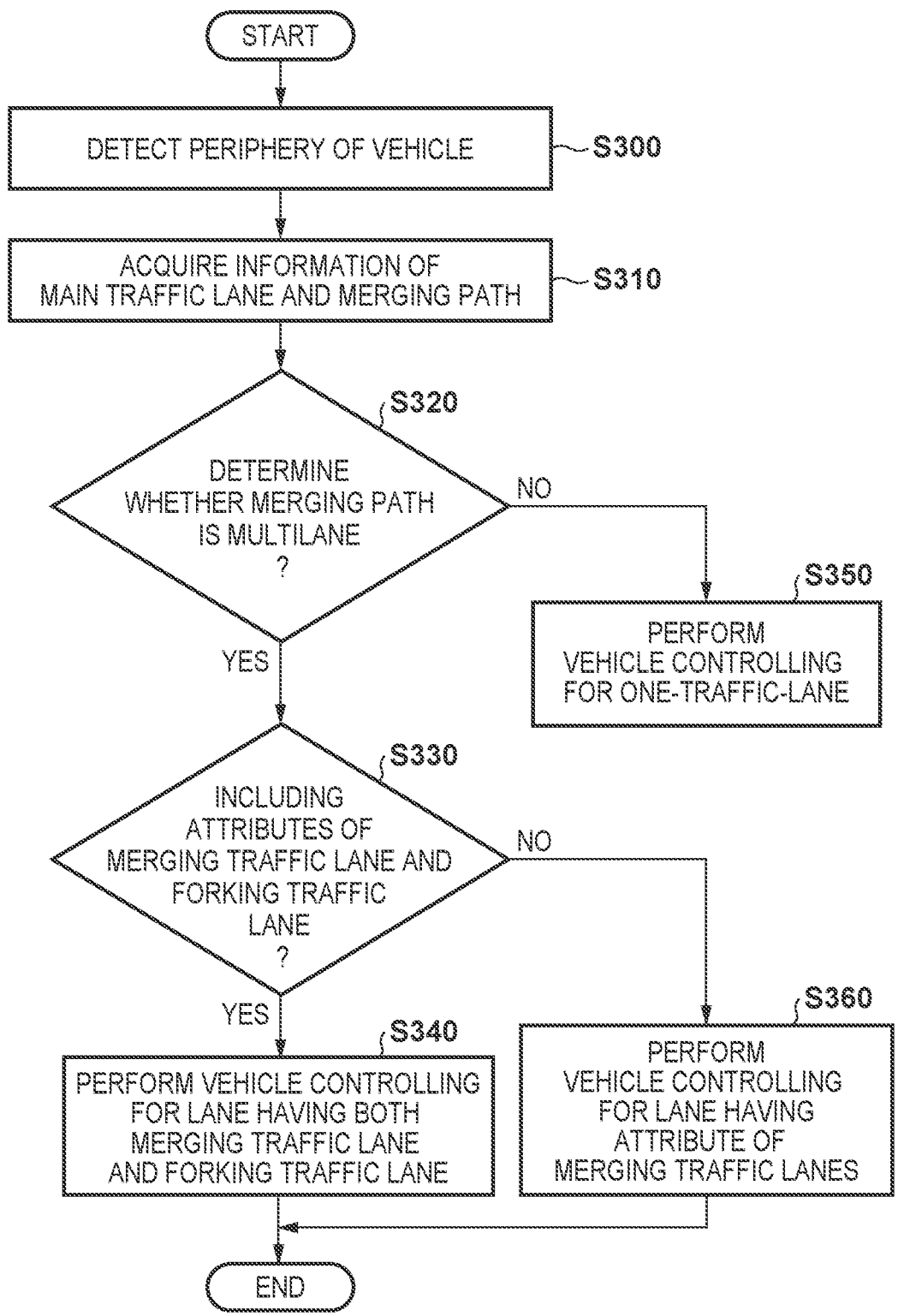
FIG. 3 is a view for describing a flow of processing of vehicle control according to an embodiment.
Figure 4:
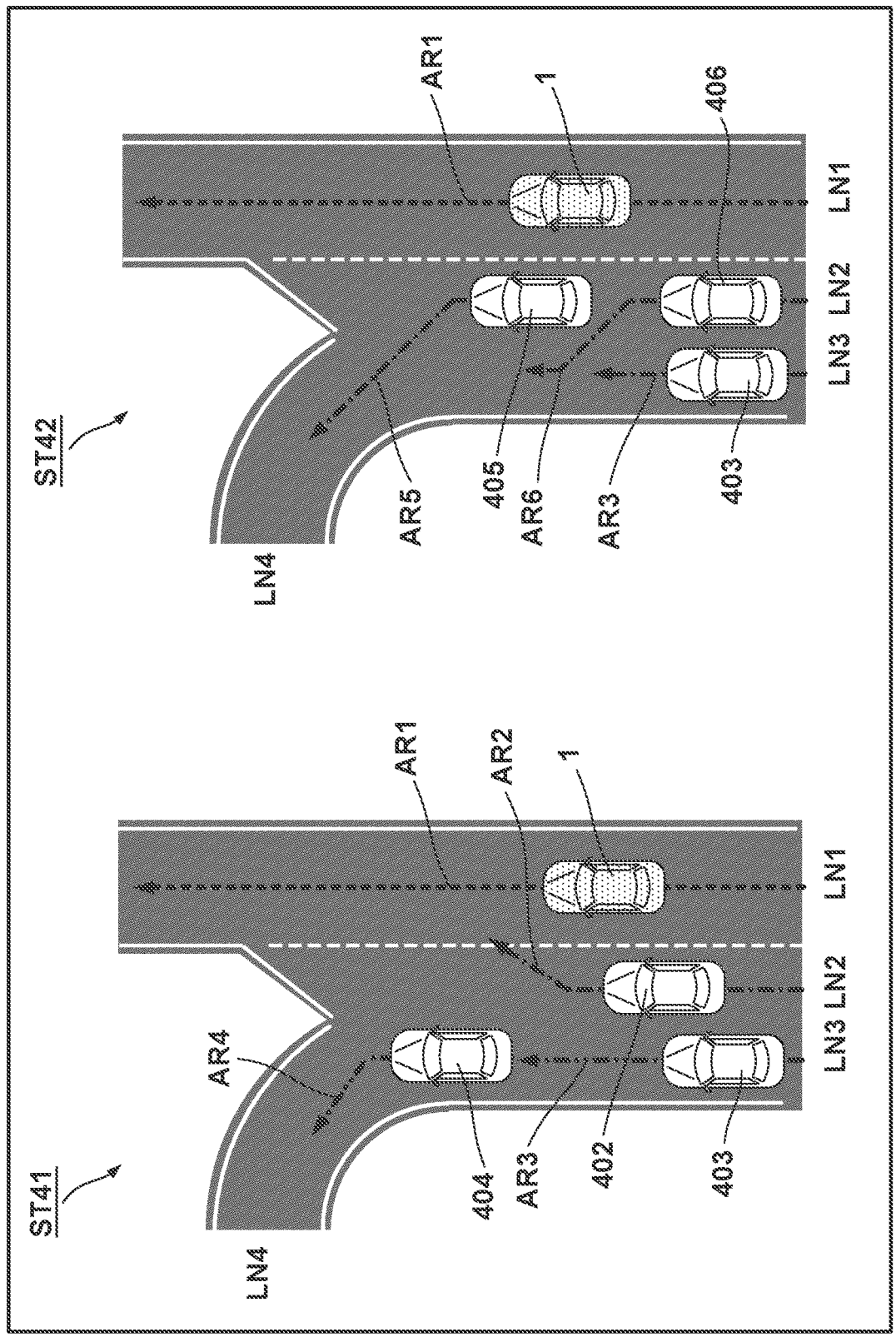
FIG. 4 is a view for schematically describing vehicle control of step S340 which is executed in a case where another vehicle merges into a main traffic lane.
Figure 5:
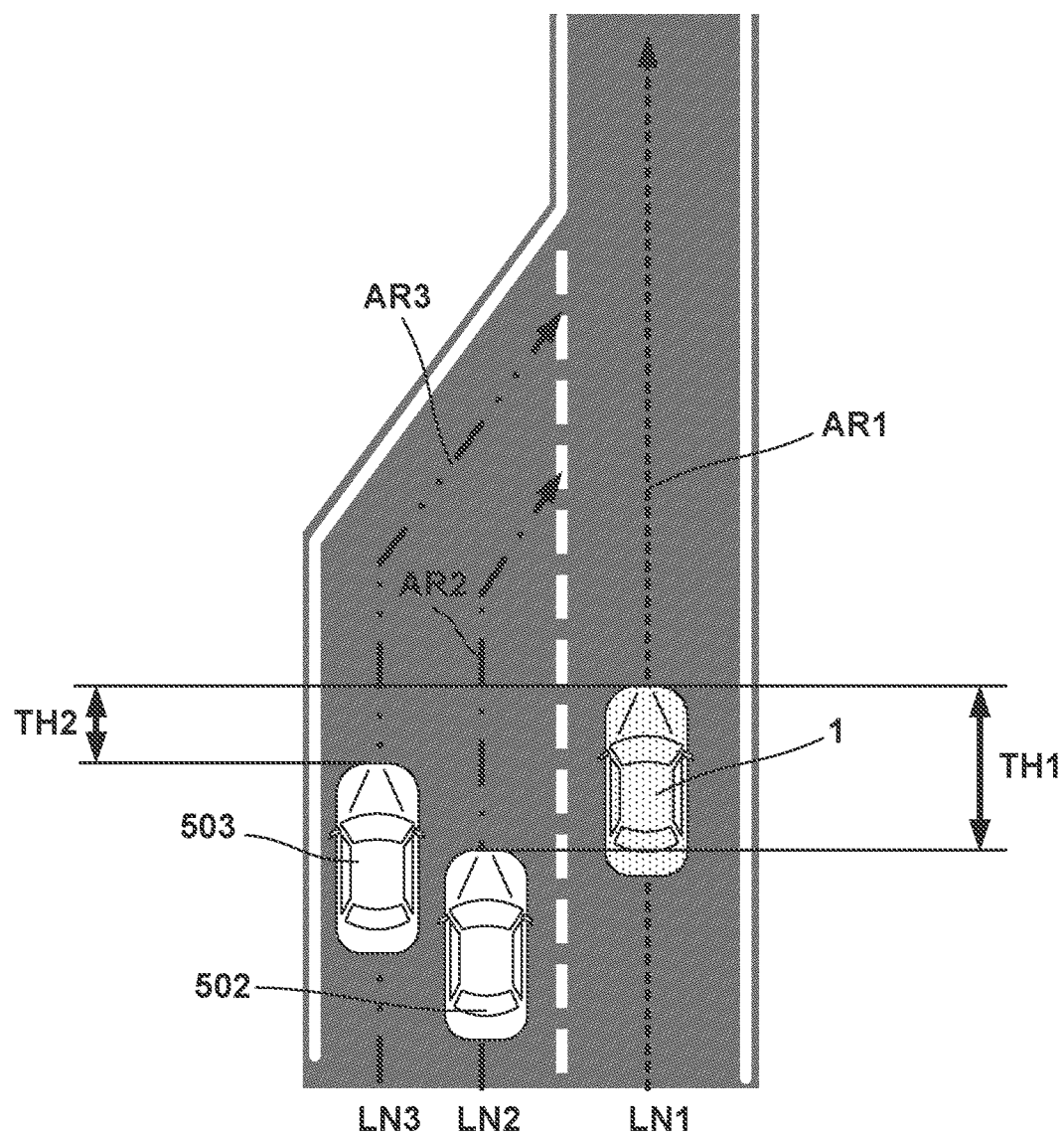
FIG. 5 is a view for schematically describing vehicle control of step S360 which is executed in a case where other vehicles merge into the main traffic lane.

An example of control of the vehicle 1 that the ECU 20 executes will now be described. FIG. 3 is a view for describing the flow of processing of vehicle control in accordance with an embodiment, and FIG. 4 and FIG. 5 are views for schematically describing vehicle control that the ECU 20 executes in a case where another vehicle merges into the traffic lane LN1 (the main traffic lane). The ECU 20 automatically controls driving of the vehicle 1 towards a destination in accordance with a route (FIG. 4 and a traffic lane (LN1) of FIG. 5) found by the ECU 24 when the destination and automated driving are designated by the driver. During automatic control, the ECU 20 acquires information related to the peripheral state of the vehicle 1 from the ECUs 22 and 23, makes instructions to the ECU 21, the ECUs 26 and 29 based on the acquired information, and executes steering and acceleration control, and constant speed driving control, and deceleration control of the vehicle 1.

The ECU 22 performs control of one camera 41 and each LiDAR 42 and information processing of detection results. Also, the ECU 23 performs control of the other camera 41 and each radar 43 and detection result information processing. The ECU 20 executes control associated with automated driving of the vehicle 1.

In step S300, the camera 41, each LiDAR 42, and each radar 43 detects the periphery of the vehicle 1.

In step S310, the ECU 22 and the ECU 23 function as an acquisition unit, and acquire information related to a detection region in the periphery of the vehicle 1. The ECU 22 and the ECU 23 (the acquisition unit), based on a detection result of the GPS sensor S4, acquire a current position (position information) of the vehicle in the map information and road information of a traffic lane (the main traffic lane) that the vehicle (the self-vehicle) is travelling in. Also, the ECU 22 and the ECU 23 (acquisition unit), based on map information, acquires road information such as a road attribute of the merging path that merges into the main traffic lane and the number of traffic lanes of the merging path.

In step S320, the ECU 20 that executes the control associated with the automated driving of the vehicle 1 functions as a control unit, and the ECU 20 (the control unit), based on information that the ECU 22 and the ECU 23 (the acquisition unit) acquired, determines the road attributes of the merging path that connects to the traffic lane (the main traffic lane) in which the vehicle 1 travels.

The ECU 20 (the control unit) determines whether the merging path that connects to the traffic lane (the main traffic lane) is multilane, and in the case where the merging path is not a plurality of traffic lanes (S320-No), the processing advances to step S350, and the ECU 20 (the control unit) performs vehicle control for a case where the other vehicle will merge into the traffic lane (main traffic lane) from the one-traffic-lane merging path. Merging from a one traffic-lane merging path is similar to a case of merging into the traffic lane 1 (the main traffic lane) from a first merging traffic lane (traffic lane LN2 of FIG. 5) in multiple-traffic-lane merging that is described in step S360 later, and the ECU 20 (the control unit) can set a threshold value (a first threshold value TH1) similar to with the first merging traffic lane (the traffic lane LN2 of FIG. 5), and performs the vehicle control.

Meanwhile, in the determination of step S320, in a case where the merging path that connects to the traffic lane (the main traffic lane) (S320—Yes) is a plurality of traffic lanes, the ECU 20 (the control unit) advances the processing to step S330. Then, in step S330, the ECU 20 (the control unit) determines whether an attribute of a merging traffic lane that merges into the traffic lane (the main traffic lane) and an attribute of a forking traffic lane that is connected to the merging traffic lane and separates from the main traffic lane are included in the merging path road attributes.

In a case where the merging path has attributes of both the merging traffic lane and the forking traffic lane (S330—Yes), in step S340, the ECU 20 (the control unit), for a merging path having both merging traffic lane and forking traffic lane attributes, performs vehicle control (step S340) in a case where another vehicle will merge into the traffic lane (the main traffic lane) from the merging traffic lane adjacent to the traffic lane (the main traffic lane).

FIG. 4 is a view for describing vehicle control (step S340) in a case where another vehicle merges into the traffic lane from a merging path having both the merging traffic lane and the forking traffic lane attributes. In ST41 of FIG. 4, a main traffic lane in which the vehicle 1 (the self-vehicle) travels is the traffic lane LN1, and a state in which the vehicle 1 (the self-vehicle) is traveling in the traffic lane LN1 in accordance with an arrow symbol AR1 is illustrated.

A traffic lane LN2 is a merging traffic lane (a first merging traffic lane) that is adjacent to the traffic lane LN1 (the main traffic lane), and a traffic lane LN3 is a merging traffic lane in a position apart from the traffic lane LN1 (the main traffic lane) in the widthwise direction, and a traffic lane LN4 is a forking traffic lane (second merging traffic lane) connected to the merging traffic lanes (LN2 and LN3) and is apart from the traffic lane LN1 (the main traffic lane).

A state in which the merging path has an attribute of a merging traffic lane (LN2, LN3) and a forking traffic lane (LN4), and other vehicle 402 travels in the merging traffic lane (the first merging traffic lane: the traffic lane LN2), and other vehicle 403 travels in the merging traffic lane (the second merging traffic lane: the traffic lane LN3), and other vehicle 404 travels in the forking traffic lane (the traffic lane LN4) is illustrated. The arrow symbols AR2 to AR4 indicate the travel directions of the other vehicles 402 to 404.

The ECU 20 (the control unit), based on information that the ECU 22 and the ECU 23 (acquisition units) acquired, determines whether or not the other vehicles 402 to 404 traveling in the plurality of traffic lanes of the merging path that merges with the traffic lane LN1 in which the vehicle 1 travels will merge into the traffic lane LN1, and based on the determination, controls the travel of the vehicle 1.

The ECU 20 (the control unit), based on information that the ECU 22 and the ECU 23 (the acquisition unit) acquired, in a case where there are the attributes of a merging traffic lane (the traffic lane LN2) that is adjacent to the traffic lane LN1, a merging traffic lane (the traffic lane LN3) at a position apart from the traffic lane LN1 in the width direction, and a forking traffic lane (the traffic lane LN4) that is connected to the merging traffic lanes (the traffic lane LN2, the traffic lane LN3) and is apart from the traffic lane LN1, determines whether another vehicle (the other vehicle 402 of ST41 in FIG. 4) which travels in the merging traffic lane (the traffic lane LN2) that is adjacent to the traffic lane LN1 among the plurality of attributes will merge into the traffic lane LN1 (the main traffic lane), and based on the determination, controls the travel of the vehicle 1.

The ECU 20 (the control unit), in the processing of the determination, controls the travel of the vehicle so as to exclude the other vehicle 403 traveling in the merging traffic lane (the traffic lane LN3) in a position apart from the traffic lane LN1 in the widthwise direction, and the other vehicle 404 traveling in the forking traffic lane (the traffic lane LN4) connected to the merging traffic lanes (the traffic lane LN2, the traffic lane LN3) that separates from the traffic lane LN1 (the main traffic lane). In other words, the ECU 20 (the control unit) performs vehicle control during merging based on the relative positioning between the other vehicle 402 traveling in the merging traffic lane (the traffic lane LN2) adjacent to the traffic lane LN1 (the main traffic lane) and the vehicle 1 (the self-vehicle), as the target of the determination processing, and the other vehicles 403 and 404 traveling in the merging traffic lane (the traffic lane LN3) and the forking traffic lane (the traffic lane LN4) are excluded from the vehicle control during the merging.

The ECU 20 (the control unit), based on information that the ECU 22 and the ECU 23 (acquisition unit) acquired, in a case where another vehicle (the other vehicle 405 of ST42) makes a lane change into the forking traffic lane (the traffic lane LN4) as indicated by the arrow symbol AR5 of ST42 from the merging traffic lane (the traffic lane LN2) that is adjacent to the traffic lane LN1, travel of the vehicle is controlled so as to exclude the other vehicle 405 that makes the lane change from the plurality of other vehicles that travel in the merging traffic lane (the traffic lane LN2).

Also, the ECU 20 (the control unit), in a case where there is another vehicle (the other vehicle 406 in ST42) that makes a lane change into a merging traffic lane (the traffic lane LN3) as indicated by the arrow symbol AR6 of ST42 from the merging traffic lane (the traffic lane LN2) that is adjacent to the traffic lane LN1, controls the travel of the vehicle so as to exclude the other vehicle 406 which makes the lane change from the plurality of other vehicles that travel in the merging traffic lane (the traffic lane LN2). The timing of excluding the other vehicle 406 that makes the lane change from the merging traffic lane (traffic lane LN2) into the merging traffic lane (traffic lane LN3) from the vehicle control of the vehicle 1 is the timing of the blinker being lit by the other vehicle 406 or the timing at which the other vehicle 406 moves a predetermined distance in the width direction toward the merging traffic lane (traffic lane LN3) side from the merging traffic lane (traffic lane LN2), and the other vehicle 406 can be excluded from the vehicle control of the vehicle 1 before it moves to the merging traffic lane (traffic lane LN3) side. Accordingly, by excluding in advance another vehicle that will not merge into the traffic lane LN1 (the main traffic lane) from the processing in the vehicle control, it becomes possible to prevent false detection of another vehicle which will not merge as a vehicle that will merge, and to prevent execution of vehicle control for adjusting the relative position with respect to another vehicle that is actually not necessary in the travel control of the vehicle 1.

Returning to the description of FIG. 3, in a case where in the determination of step S330, the attribute of a forking traffic lane that separates from the traffic lane (the main traffic lane) is not included in the attributes that the merging path has, the ECU 20 (the control unit) determines that all of the plurality of traffic lanes are merging traffic lanes, and advances the processing to step S360. Then, in step S360, the ECU 20 (the control unit) performs (step S360) vehicle control in the case where the other vehicle merges into the traffic lane (the main traffic lane) from the merging path having the attribute of a plurality of merging traffic lanes.

FIG. 5 is a view for describing vehicle control (step S360) in a case where another vehicle merges into the traffic lane (the main traffic lane) from a merging path having an attribute of a plurality of merging traffic lanes. In FIG. 5, the main traffic lane in which the vehicle 1 (self-vehicle) travels is the traffic lane LN1, and a state in which the vehicle 1 (the self-vehicle) is traveling in the traffic lane LN1 in accordance with the arrow symbol AR1 is illustrated. The traffic lane LN2 is a merging traffic lane (a first merging traffic lane) that is adjacent to the traffic lane LN1 (the main traffic lane), and the traffic lane LN3 is a merging traffic lane (a second merging traffic lane) at a position that is apart in the width direction of the traffic lane LN1 (the main traffic lane) compared to the merging traffic lane (the first merging traffic lane). A state in which the other vehicle 502 travels in the merging traffic lane (the first merging traffic lane: the traffic lane LN2) and the other vehicle 503 is traveling in the merging traffic lane (the second merging traffic lane: the traffic lane LN3) is illustrated. The arrow symbols AR2 to AR3 indicate the travel directions of the other vehicles 402 to 403.

The ECU 20 (the control unit) determines that the other vehicles that travel in the merging path will merge into the traffic lane LN1 (the main traffic lane) from the merging path (the traffic lane LN2, the traffic lane LN3) in a case where, based on the information that the ECU 22 and the ECU 23 (the acquisition unit) acquired, an attribute of a forking traffic lane that separates from the traffic lane (the main traffic lane) is not included in the attributes that the merging path has. The ECU 20 (the control unit), in a case where it determined that there is another vehicle that will merge into the traffic lane LN1 (the main traffic lane) from the merging path, sets different thresholds (TH1, TH2) for controlling the relative positioning between the vehicle 1 (the self-vehicle) and the other vehicles 502 and 503 in accordance with the merging traffic lane that the other vehicles travel in. The ECU 20 (the control unit), based on the information that the ECU 22 and the ECU 23 (the acquisition unit) acquired, sets the first threshold value TH1 in the case where the other vehicle 502 is traveling in the first merging traffic lane (the traffic lane LN2), and sets the second threshold value TH2, which is smaller than the first threshold value TH1, in the case where the other vehicle 503 is traveling in the second merging traffic lane (the traffic lane LN3).

The ECU 20 (the control unit), in the case where the other vehicle 502 is traveling in the first merging traffic lane (the traffic lane LN2), if the relative distance in the travel direction between the vehicle 1 and the other vehicle 502 therebehind is greater than the first threshold value TH1, performs acceleration control for accelerating the vehicle 1. Also, the ECU 20 (the control unit), in a case where the other vehicle 503 is traveling in the second merging traffic lane (the traffic lane LN3), if the relative distance in the travel direction between the vehicle 1 and the other vehicle 503 therebehind is greater than the second threshold value TH2, performs acceleration control.

Note that the ECU 20 (the control unit), in a case where, based on information that the ECU 22 and the ECU 23 (the acquisition unit) acquired, determines that it will be possible to overtake the other vehicles by constant-speed travel at the current speed even without performing acceleration control based on the relative speed between the vehicle 1 (the self-vehicle) and the other vehicles 502 and 503, overtaking control for overtaking the other vehicles is performed at the constant speed. Whether or not to execute overtaking control is something that is based on the set thresholds, and the ECU 20 (the control unit), in a case where the other vehicle 502 is traveling in the first merging traffic lane (the traffic lane LN2), if the relative distance in the travel direction between the vehicle and the other vehicle therebehind is larger than the first threshold value TH1, performs overtaking control with the vehicle 1 for overtaking the other vehicle 502 by constant-speed travel, and in the case where the other vehicle 503 is traveling in the second merging traffic lane (the traffic lane LN3), if the relative distance is larger than the second threshold value TH2, performs the overtaking control. Here, the overtaking is not limited to the case where the vehicle 1 (the self-vehicle) overtakes from behind the other vehicle, and includes cases where the vehicle 1 (the self-vehicle) is already in front of the other vehicle, and the speed of the vehicle 1 (the self-vehicle) is faster than the speed of the other vehicle, and the relative distance between the vehicle 1 (the self-vehicle) and another vehicle increases.

Because the second threshold value TH2 is a smaller value than the first threshold value TH1, the ECU 20 (the control unit) can execute acceleration control and overtaking control at a shorter relative distance in the second merging traffic lane in the relative positional relationship with respect to the vehicle 1. In other words, it is easier for the ECU 20 (the control unit) to execute acceleration control and overtaking control in relation to the other vehicle 503 traveling in the second merging traffic lane (the traffic lane LN3) than in relation to the other vehicle 502 traveling in the first merging traffic lane (the traffic lane LN2). In other words, it is more difficult for the ECU 20 (the control unit) to execute acceleration control and overtaking control in relation to the other vehicle 502 that is traveling in the first merging traffic lane (the traffic lane LN2) than in relation to the other vehicle 503 traveling in the second merging traffic lane (the traffic lane LN3).

Meanwhile, the ECU 20 (the control unit), in the case where the relative positioning between the vehicle 1 and the other vehicle is less than or equal to the set threshold, performs deceleration control for causing the vehicle 1 to decelerate, and performs deceleration control for ensuring space to merge in relation to the other vehicle merging into the traffic lane (the main traffic lane).

The ECU 20 (the control unit), in the case where the other vehicle 502 is traveling in the first merging traffic lane (the traffic lane LN2), performs deceleration control for causing the vehicle 1 to decelerate when the relative distance in the travel direction between the vehicle and the other vehicle therebehind is less than or equal to the first threshold value TH1. Also, the ECU 20 (the control unit), in the case where the other vehicle 503 is traveling in the second merging traffic lane (the traffic lane LN3), if the relative distance is less than or equal to the second threshold value TH2, deceleration control is performed.

Because the first threshold value TH1 is a value that is larger than the second threshold value TH2, in the positional relationship relative to the vehicle 1, in the first merging traffic lane, the ECU 20 (the control unit) is enabled to execute deceleration control at a position at a longer relative distance. In other words, it becomes easier for the ECU 20 (the control unit) to execute deceleration control in relation to the other vehicle 503 that is traveling in the first merging traffic lane (the traffic lane LN2) than in relation to the other vehicle 502 which is traveling in the second merging traffic lane (the traffic lane LN3). In other words, it becomes more difficult for the ECU 20 (the control unit) to execute deceleration control in relation to the other vehicle 503 that is traveling in the second merging traffic lane (the traffic lane LN3) than in relation to the other vehicle 502 which is traveling in the first merging traffic lane (the traffic lane LN2).

Consequently, it is possible to control the vehicle 1 so that acceleration control and overtaking control is not performed until it is possible to ensure a sufficient relative distance in relation to the vehicle 1 (the self-vehicle), which is longer in relation to the other vehicle 502 in the first merging traffic lane (the traffic lane LN2) which is at a closer position in the vehicle width direction than in relation to the other vehicle 503 in the second merging traffic lane (the traffic lane LN3), and in the case where the relative distance cannot be ensured, it is possible to control so that the space for merging is ensured by deceleration control.

Also, even though the relative distance in the travel direction to the vehicle 1 (the self-vehicle) is shorter in relation to the other vehicle 503 in the second merging traffic lane (the traffic lane LN3) which is at a position that is farther away in the vehicle width direction than in relation to the other vehicle 502 in the first merging traffic lane (the traffic lane LN2), the positional relationship is such that it is apart in the vehicle width direction. Accordingly, the ECU 20 (the control unit), in a state in which the relative distance of the second threshold value TH2 which is shorter than the first threshold value TH1 can be ensured, controls the vehicle 1 so as to perform acceleration control or overtaking control, and it is possible to control so that, if the relative position cannot be ensured, merging space is ensured by deceleration control.

Note that in the example of the vehicle control described in FIG. 4 and FIG. 5, description is given of an example of a case where another vehicle is positioned behind the vehicle 1 (the self-vehicle), but the vehicle control by the vehicle control device is not limited to this, and there may be cases where the other vehicle is positioned in front of the vehicle 1 (the self-vehicle). In such a case, if the magnitude relationship between the first threshold value TH1 and the second threshold value TH2 is reversed, it is possible to similarly apply the above-described vehicle control, to vehicle control in the case where the other vehicle is positioned in front of the vehicle 1 (the self-vehicle).

Summary of Embodiments

The above-described embodiments disclose at least the following vehicle control device, vehicle comprising a vehicle control device, vehicle control method for a vehicle control device, and storage medium in which a program is stored.

Configuration 1. A vehicle control device of the above-described embodiments is a vehicle control device (for example, 100 in FIG. 1) for controlling travel of a vehicle (for example, 1 in FIG. 2), the device comprising:

an acquisition unit (for example, the ECUs 22 and 23) that acquires information of the periphery of the vehicle (1); and a control unit (for example, the ECU 20) that, based on information that the acquisition unit (the ECUs 22 and 23) acquired, determines whether or not another vehicle traveling in one of a plurality of traffic lanes of a merging path that merges with a traffic lane (for example, the traffic lane LN1 of FIG. 4) in which the vehicle (1) travels will merge into the traffic lane (the traffic lane LN1), and based on the determination, controls the travel of the vehicle (1).

By virtue of the vehicle control device of configuration 1, it is possible to determine whether or not another vehicle that travels in one of a plurality of traffic lanes of a merging path that merges into the traffic lane that the vehicle is traveling in will merge into the traffic lane, and control the traveling of the vehicle based on the determination.

Configuration 2. In the vehicle control device (100) of the above-described embodiments, the merging path, as the plurality of traffic lanes, includes a first merging traffic lane (for example, the traffic lane LN2 of FIG. 5) adjacent to the traffic lane; and a second merging traffic lane (for example, the traffic lane LN3 of FIG. 5) in a position more apart from the traffic lane (LN1) in a width direction of the traffic lane than the first merging traffic lane (the traffic lane LN2), wherein the control unit (20), in a case where the other vehicle (for example, 502 and 503 of FIG. 5), which will merge into the traffic lane from the merging path, is determined to be present, in accordance with a merging traffic lane (the traffic lane LN2, the traffic lane LN3) in which the other vehicle (502, 503) travels, sets a different threshold (for example, TH1 and TH2 of FIG. 5) for controlling a relative positioning between the vehicle (1) and the other vehicle (502, 503).

Configuration 3. In the vehicle control device (100) of the above-described embodiments, the control unit (the ECU 20), based on information that the acquisition unit (the ECUs 22 and 23) acquired, sets the first threshold value (TH1) in a case where the other vehicle (502) is traveling in the first merging traffic lane (the traffic lane LN2), and sets the second threshold value (TH2) in a case where the other vehicle (502) is traveling in the second merging traffic lane (the traffic lane LN3).

Configuration 4. In the vehicle control device (100) of the above-described embodiments, the control unit (the ECU 20) performs acceleration control of the vehicle in a case where a relative distance between the vehicle and the other vehicle is larger than the set threshold, and sets the first threshold value (TH1) and the second threshold value (TH2) so that execution of acceleration control of the vehicle is made easier in a case where the other vehicle is traveling in the second merging traffic lane (the traffic lane LN3) than in the case where the other vehicle is traveling in the first merging traffic lane (the traffic lane LN2).

Configuration 5. In the vehicle control device (100) of the above-described embodiments, the control unit (the ECU 20) performs overtaking control of the vehicle in a case where a relative distance between the vehicle and the other vehicle is larger than the set threshold, and sets the first threshold value (TH1) and the second threshold value (TH2) so that execution of overtaking control of the vehicle is made easier in a case where the other vehicle is traveling in the second merging traffic lane (the traffic lane LN3) than in the case where the other vehicle is traveling in the first merging traffic lane (the traffic lane LN2).

Configuration 6. In the vehicle control device (100) of the above-described embodiments, the control unit (the ECU 20) performs deceleration control of the vehicle in a case where a relative distance between the vehicle and the other vehicle is less than or equal to the set threshold, and sets the first threshold value (TH1) and the second threshold value (TH2) so that execution of deceleration control of the vehicle is made easier in a case where the other vehicle is traveling in the second merging traffic lane (the traffic lane LN3) than in the case where the other vehicle is traveling in the first merging traffic lane (the traffic lane LN2).

By virtue of the vehicle control device of configurations 1 to 6, it is possible to control the vehicle 1 so that acceleration control and overtaking control is not performed until it is possible to ensure a sufficient relative distance in relation to the vehicle 1, which is longer in relation to the other vehicle 502 in the first merging traffic lane which is at a closer position in the vehicle width direction than in relation to the other vehicle 503 in the second merging traffic lane, and in the case where the relative distance cannot be ensured, it is possible to control so that the space for merging is ensured by deceleration control.

Also, even though the relative distance in the travel direction to the vehicle 1 is shorter in relation to the other vehicle 503 in the second merging traffic lane which is at a position that is farther away in the vehicle width direction than in relation to the other vehicle 502 in the first merging traffic lane, the positional relationship is such that it is apart in the vehicle width direction. Accordingly, the ECU 20 (the control unit), in a state in which the relative distance of the second threshold value TH2 which is shorter than the first threshold value TH1 can be ensured, controls the vehicle 1 so as to perform acceleration control or overtaking control, and it is possible to control so that, if the relative position cannot be ensured, merging space is ensured by deceleration control.

Configuration 7. In the vehicle control device (100) of the above-described embodiment, the control unit (the ECU 20), based on information that the acquisition unit (the ECUs 22 and 23) acquired, in a case where, the merging path has an attribute of a merging traffic lane (for example, LN2 of FIG. 4) which is adjacent to the traffic lane, of a merging traffic lane (for example, LN3 of FIG. 4) in a position apart in a width direction of the traffic lane, and of a forking traffic lane (for example, LN4 of FIG. 4) which is connected to the merging traffic lanes (LN2 and LN3) and separates from the traffic lane (1), determines whether or not another vehicle (for example, 402, 405, or 406 of FIG. 4) that travels in a merging traffic lane (LN2) that is adjacent to the traffic lane (LN1) among the attributes will merge into the traffic lane (1), and based on the determination, controls travel of the vehicle (1).

Configuration 8. In the vehicle control device (100) of the above-described embodiments, the control unit (the ECU 20), in the determination processing, controls travel of the vehicle so as to exclude another vehicle (for example, 403 in FIG. 4) that travels in a merging traffic lane (LN3) in the apart position and another vehicle (for example, 404 in FIG. 4) that travels in the forking traffic lane (LN4).

Configuration 9. In the vehicle control device (100) of the above-described embodiments, the control unit (the ECU 20), based on information that the acquisition unit (the ECUs 22 and 23) acquired, in a case where there is another vehicle (for example, 405 in FIG. 4) that makes a lane change into the forking traffic lane (LN4) from the merging traffic lane (LN2) that is adjacent to the traffic lane (LN1), controls travel of the vehicle so as to exclude the other vehicle (405) that made the lane change from the plurality of other vehicles that travel in the merging traffic lane.

Configuration 10. In the vehicle control device (100) of the above-described embodiments, the control unit (the ECU 20), based on information that the acquisition unit (the ECUs 22 and 23) acquired, in a case where there is another vehicle (for example, 406 in FIG. 4) that makes a lane change into the merging traffic lane (LN3) in the apart position from the merging traffic lane (LN2) that is adjacent to the traffic lane (LN1), controls travel of the vehicle so as to exclude the other vehicle (406) that made the lane change from the plurality of other vehicles that travel in the merging traffic lane.

By virtue of the vehicle control device of configuration 7 through configuration 10, by excluding in advance, from the processing in the vehicle control, another vehicle that will not merge into the traffic lane LN1 (the main traffic lane), it becomes possible to prevent false detection of another vehicle which will not merge as a vehicle that will merge, and to prevent execution of vehicle control for adjusting the relative position with respect to another vehicle that is actually not necessary in the travel control of the vehicle 1.

Configuration 11. The vehicle of the above-described embodiments is a vehicle (for example, 1 in FIG. 2) that has a vehicle control device (for example, 100 in FIG. 1) that controls travel of the vehicle, wherein the vehicle control device (100) comprises an acquisition unit (for example, the ECUs 22 and 23) for acquiring information of the periphery of the vehicle (1); and a control unit (for example, the ECU 20) that, based on information that the acquisition unit (the ECUs 22 and 23) acquired, determines whether or not another vehicle traveling in one of a plurality of traffic lanes of a merging path that merges with a traffic lane (for example, the traffic lane LN1 of FIG. 4) in which the vehicle (1) travels will merge into the traffic lane (the traffic lane LN1), and based on the determination, controls the travel of the vehicle (1).

By virtue of the vehicle of configuration 11, it becomes possible to provide a vehicle having a vehicle control device (for example, 100 in FIG. 1) that can determine whether or not another vehicle that travels in one of a plurality of traffic lanes of a merging path that merges into a traffic lane that the vehicle is traveling in will merge into the traffic lane, and control the traveling of the vehicle (for example, 1 in FIG. 2) based on the determination.

Configuration 12. The vehicle control method of the above-described embodiments is a vehicle control method of the vehicle control device (for example, 100 of FIG. 1) that controls travel of the vehicle, the method comprising:

acquiring information of the periphery of the vehicle (for example, step S300 and step S310 of FIG. 3); and based on the acquired information, determining whether or not another vehicle, which travels in one of a plurality of traffic lanes of a merging path that merges into a traffic lane that the vehicle is traveling in, will merge into the traffic lane, and based on the determination, controlling travel of the vehicle (for example, step S320 to step S360 of FIG. 3).

Configuration 13. A storage medium storing a program of the above-described embodiments is a storage medium storing a program that causes a computer to execute each step of the vehicle control method of the vehicle control device (for example, 100 of FIG. 1), which controls travel of the vehicle, the vehicle control method comprising:

acquiring information of the periphery of the vehicle (for example, step S300 and step S310 of FIG. 3); and based on the acquired information, determining whether or not another vehicle, which travels in one of a plurality of traffic lanes of a merging path that merges into a traffic lane that the vehicle is traveling in, will merge into the traffic lane, and based on the determination, controlling travel of the vehicle (for example, step S320 to step S360 of FIG. 3).

By virtue of the vehicle control method of configuration 12 and the storage medium storing the program of configuration 13, it becomes possible to determine whether or not another vehicle that travels in one of a plurality of traffic lanes of a merging path that merges into the traffic lane that the vehicle is traveling in will merge into the traffic lane, and control the traveling of the vehicle based on the determination.

Other Embodiments

The present invention can be implemented by providing a program that implements the functions of the above-described embodiments in a system or device via a network or storage medium, and one or more processors in a computer in the system or device performing processing that reads and executes the program.

The invention is not limited to the foregoing embodiments, and various variations/changes are possible within the spirit of the invention.

What is claimed is:

1. A vehicle control device that controls traveling of a vehicle, the vehicle control device comprising:
    at least one processor circuit with a memory comprising instructions, that when executed by the at least one processor circuit, cause the at least one processor circuit to at least:
    acquire information of a periphery of the vehicle; and
    based on the information, determine whether or not another vehicle, which travels in one of a plurality of traffic lanes of a merging path that merges into a traffic lane that the vehicle is traveling in, will merge into the traffic lane, and based on the determination, control travel of the vehicle,
    wherein the merging path includes, as the plurality of traffic lanes,
    a first merging traffic lane adjacent to the traffic lane and
    a second merging traffic lane in a position more apart from the traffic lane in a width direction of the traffic lane than the first merging traffic lane, and
    the instructions, when executed by the at least one processor circuit, further cause the at least one processor circuit to at least:
    in a case where it is determined that the another vehicle, which will merge from the merging path to the traffic lane, is present,
    set different threshold values to control the relative positioning between the vehicle and the another vehicle depending on what merging traffic lane the another vehicle is traveling in, and
    set a first threshold value when the another vehicle is traveling in the first merging traffic lane and sets a second threshold value when the another vehicle is traveling in the second merging traffic lane.

2. The vehicle control device according to claim 1, wherein the instructions, when executed by the at least one processor circuit, further cause the at least one processor circuit to at least:
    perform acceleration control of the vehicle in a case where a relative distance between the vehicle and the another vehicle is larger than the set threshold value, and
    set the first threshold value and the second threshold value so that it is easier to execute acceleration control of the vehicle in a case where the another vehicle is traveling in the second merging traffic lane than in a case where the another vehicle is traveling in the first merging traffic lane.

3. The vehicle control device according to claim 1, wherein the instructions, when executed by the at least one processor circuit, further cause the at least one processor circuit to at least:
    perform overtaking control of the vehicle in a case where a relative distance between the vehicle and the another vehicle is larger than the set threshold value, and
    set the first threshold value and the second threshold value so that it is easier to execute overtaking control of the vehicle in a case where the another vehicle is traveling in the second merging traffic lane than in a case where the another vehicle is traveling in the first merging traffic lane.

4. The vehicle control device according to claim 1, wherein the instructions, when executed by the at least one processor circuit, further cause the at least one processor circuit to at least:
    perform deceleration control of the vehicle in a case where a relative distance between the vehicle and the another vehicle is less than or equal to the set threshold value, and
    set the first threshold value and the second threshold value so that it is easier to execute deceleration control of the vehicle in a case where the another vehicle is traveling in the second merging traffic lane than in a case where the another vehicle is traveling in the first merging traffic lane.

5. The vehicle control device according to claim 1, wherein the instructions, when executed by the at least one processor circuit, further cause the at least one processor circuit to at least: based on the information,
    in a case where the merging path has attributes of a merging traffic lane that is adjacent to a traffic lane, a merging traffic lane that is positioned apart in a width direction of the traffic lane, and a forking traffic lane that is connected to the merging traffic lane and separates from the traffic lane,
    determine whether or not another vehicle that travels in a merging traffic lane that is adjacent to the traffic lane among the attributes will merge into the traffic lane, and based on the determination, control travel of the vehicle.

6. The vehicle control device according to claim 5, wherein the instructions, when executed by the at least one processor circuit, further cause the at least one processor circuit to at least:
    acquire information of another vehicle detected by a sensor in a detection region in the periphery of the vehicle,
    determine, based on the information, that another vehicle traveling in the merging traffic lane in the apart position will merge into the forking traffic lane and another vehicle traveling the forking traffic lane will travel in the forking traffic lane, and
    control, based on the determination, the traveling of the vehicle so as to exclude the another vehicle traveling in the merging traffic lane in the apart position and the another vehicle traveling the forking traffic lane.

7. The vehicle control device according to claim 5, wherein the instructions, when executed by the at least one processor circuit, further cause the at least one processor circuit to at least:
    acquire information of another vehicle detected by a sensor in a detection region in the periphery of the vehicle,
    based on the information, in a case where another vehicle, which will make a lane change into the forking traffic lane from the merging traffic lane that is adjacent to the traffic lane, is present,
    determine that the another vehicle traveling will travel in the forking traffic lane, and
    control travel of the vehicle so as to exclude the another vehicle that performed the lane change from a plurality of other vehicles that travel in the merging traffic lane.

8. The vehicle control device according to claim 5, wherein the instructions, when executed by the at least one processor circuit, further cause the at least one processor circuit to at least:

acquire information of another vehicle detected by a sensor in a detection region in the periphery of the vehicle, based on the information, in a case where the another vehicle, which will make a lane change into the merging traffic lane in the apart position from the merging traffic lane that is adjacent to the traffic lane, is present, determine that the another vehicle traveling will merge into the forking traffic lane, and control travel of the vehicle so as to exclude the another vehicle that performed the lane change from a plurality of other vehicles that travel in the merging traffic lane.

9. A vehicle that has a vehicle control device that controls travel of the vehicle, wherein the vehicle control device comprises:

at least one processor circuit with a memory comprising instructions, that when executed by the at least one processor circuit, cause the at least one processor circuit to at least:

acquire information of a periphery of the vehicle; and based on the information, determine whether or not another vehicle, which travels in one of a plurality of traffic lanes of a merging path that merges into a traffic lane that the vehicle is traveling in, will merge into the traffic lane, and based on the determination, control travel of the vehicle, wherein the merging path includes, as the plurality of traffic lanes, a first merging traffic lane adjacent to the traffic lane and a second merging traffic lane in a position more apart from the traffic lane in a width direction of the traffic lane than the first merging traffic lane, and the instructions, when executed by the at least one processor circuit, further cause the at least one processor circuit to at least:

in a case where it is determined that the another vehicle, which will merge from the merging path to the traffic lane, is present, set different threshold values to control the relative positioning between the vehicle and the another vehicle depending on what merging traffic lane the another vehicle is traveling in, and set a first threshold value when the another vehicle is traveling in the first merging traffic lane and set a second threshold value when the another vehicle is traveling in the second merging traffic lane.

10. A vehicle control method of a vehicle control device that controls traveling of a vehicle, the vehicle control method comprising:

acquiring information of a periphery of the vehicle; and based on the acquired information, determining whether or not another vehicle, which travels in one of a plurality of traffic lanes of a merging path that merges into a traffic lane that the vehicle is traveling in, will merge into the traffic lane, and based on the determination, controlling travel of the vehicle, wherein the merging path includes, as the plurality of traffic lanes, a first merging traffic lane adjacent to the traffic lane and a second merging traffic lane in a position more apart from the traffic lane in a width direction of the traffic lane than the first merging traffic lane, and in a case where it is determined that the another vehicle, which will merge from the merging path to the traffic lane, is present, different threshold values are set to control the relative positioning between the vehicle and the another vehicle depending on what merging traffic lane the another vehicle is traveling in, and a first threshold value is set when the another vehicle is traveling in the first merging traffic lane and a second threshold value is set when the another vehicle is traveling in the second merging traffic lane.

11. A non-transitory computer-readable storage medium storing a program for causing a computer to execute each step of a vehicle control method of a vehicle control device that controls travel of a vehicle, the vehicle control method comprising:

acquiring information of a periphery of the vehicle; and based on the acquired information, determining whether or not another vehicle, which travels in one of a plurality of traffic lanes of a merging path that merges into a traffic lane that the vehicle is traveling in, will merge into the traffic lane, and based on the determination, controlling travel of the vehicle, wherein the merging path includes, as the plurality of traffic lanes, a first merging traffic lane adjacent to the traffic lane and a second merging traffic lane in a position more apart from the traffic lane in a width direction of the traffic lane than the first merging traffic lane, and in a case where it is determined that the another vehicle, which will merge from the merging path to the traffic lane, is present, different threshold values are set to control the relative positioning between the vehicle and the another vehicle depending on what merging traffic lane the another vehicle is traveling in, and a first threshold value is set when the another vehicle is traveling in the first merging traffic lane and a second threshold value is set when the another vehicle is traveling in the second merging traffic lane.

* * * * *